United States Patent [19]

Kemp

[11] 4,190,838
[45] Feb. 26, 1980

[54] RADIATION DETECTOR

[75] Inventor: James A. Kemp, Plano, Tex.

[73] Assignee: R A Electronics, Inc., Richardson, Tex.

[21] Appl. No.: 926,509

[22] Filed: Jul. 20, 1978

[51] Int. Cl.$^2$ .......................... G01S 7/40; H04B 17/00
[52] U.S. Cl. .................................. 343/18 E; 325/364; 343/7 PL
[58] Field of Search ........................ 343/18 E, 7 PL; 325/364

[56] References Cited

U.S. PATENT DOCUMENTS

| | | | |
|---|---|---|---|
| 2,300,081 | 10/1942 | White | 325/364 |
| 3,094,663 | 6/1963 | Siegel | 343/18 E |
| 3,246,322 | 4/1966 | Kuecken | 343/7 PL X |
| 3,408,574 | 10/1968 | Schmidt et al. | 325/364 |
| 3,530,470 | 9/1970 | Sheftelman et al. | 343/7 PL X |
| 3,550,008 | 12/1970 | Bright | 325/364 X |
| 4,072,947 | 2/1978 | Johnson | 343/14 |

*Primary Examiner*—Malcolm F. Hubler
*Attorney, Agent, or Firm*—Jack A. Kanz

[57] ABSTRACT

A radiation detector such as a radar detector is disclosed. The radiation detector includes a phase lock circuit with a modulating frequency oscillator, a radiation frequency antenna for receiving radiation, a radiation frequency modulator for modulating the radiation received with the modulating frequency, an envelope detector for detecting the modulated radiation envelope, an amplifier phase shift circuit AC coupled to the envelope detector and an alarm circuit. The phase lock circuit is responsive to the output of the amplifier-phase shift circuit. In one arrangement, the output of the phase lock circuit is a two state switch output responsive to the AC output of the amplifier-phase shift circuit. The radiation detector also includes a strip-type transmission line connecting the radiation frequency antenna, the radiation frequency modulator and the envelope detector. In one such arrangement, the radiation frequency modulator includes a p-i-n diode driven by the modulating frequency oscillator. A preferred arrangement of the envelope detector includes a Schottky diode in parallel with a capacitor connected between the conductors of the strip-type transmission line for half wave rectifying the modulated radiation. A signal attenuator attenuates the AC output of the amplifier-phase shift circuit when the phase lock circuit is in the second state so that the audible alarm phases in and out for weak signals.

16 Claims, 3 Drawing Figures

RADIATION DETECTOR

BACKGROUND OF THE INVENTION

1. Field of the Invention

The present invention relates generally to radiation detector systems and in one of its aspects to radar detectors.

2. Description of the Prior Art

A typical detector circuit of an inexpensive variety designed to be simple and economic such as a radar detector for an automobile requires a somewhat sophisticated diode detection scheme which must be reliable. Such a system usually includes a small antenna and a radiation frequency diode switch which amplitude modulates the incoming radiation frequency signal at an audio rate. The modulated radiation frequency signal is then diode detected and the modulation frequency is coupled into a tuned audio amplifier. After amplification, an audio detector senses the audio signal, which is proportional in level to the incoming radiation frequency signal, and activates a warning buzzer or light. The overall sensitivity of such a detector is a function of both the radiation frequency diode detector sensitivity and the audio detector sensitivity. A typical way of attempting to reduce the amount of noise that the audio detector senses, and thus improving the sensitivity of the overall system, is by narrowing the detection bandwidth.

SUMMARY OF THE INVENTION

The present invention concerns a method and apparatus for detecting radiation. A radiation detector according to the present invention comprises a phase lock circuit including a modulating frequency oscillator, at least one input, and at least one output drivable by a signal of substantially the modulating frequency shifted in phase by a predetermined amount applied to the at least one input, a radiation frequency antenna for receiving radiation, a radiation frequency modulator for modulating the radiation received from the antenna with the modulating frequency received from the modulating frequency oscillator, an envelope detector for detecting the modulated radiation envelope, an amplifier-phase shift circuit coupled to the AC output of the envelope detector for amplifying and shifting the phase of the AC output of the envelope detector to the predetermined amount, and an alarm circuit for generating an alarm. The at least one input of the phase lock circuit is responsive to the output of the amplifier-phase shift circuit, and the alarm circuit is responsive to the phase lock circuit so that an alarm is generated when a signal is present at the output of the amplifier-phase shift circuit.

In one embodiment, the input of the phase lock circuit is coupled to the AC output of the amplifer-phase shift circuit. The phase lock circuit further comprises a switch with a first state responsive to the AC output of the amplifier-phase shift circuit being less than a predetermined level and a second state responsive to the AC output of the amplifier-phase shift circuit being greater than the predetermined level, the at least one input of the phase lock circuit comprising the output of the switch. The alarm circuit generates an alarm responsive to the at least one output of the phase lock circuit being in the second state whereby the alarm circuit is responsive to the phase lock circuit.

In one embodiment, the radiation detector also includes a strip-type transmission line such as microstrip connecting the radiation frequency antenna, the radiation frequency modulator and the envelope detector. The radiation frequency modulator includes a device driven by the modulating frequency oscillator, the device comprising a substantially short circuit between the conductors of the strip-type transmission line during an approximately one-half of the modulating frequency cycle and a substantially open circuit between the conductors of the strip-type transmission line during the other approximately one-half of the modulating frequency cycle. Thus, the strip-type transmission line is short circuited during approximately one-half of the modulating frequency cycle so that the radiation frequency is modulated. One such device includes a p-i-n diode connected between the two conductors.

A preferred form of the envelope detector comprises a Schottky diode connected between the conductors of the strip-type transmission line for half-wave rectifying the modulated radiation, and a capacitor connected in parallel to the Schottky diode. The AC output of the envelope detector is the AC voltage across the capacitor.

One embodiment of the radiation detector includes a signal attenuator for attenuating the AC output of the amplifier phase shift circuit when the at least one output of the phase lock circuit is in the second state, the alarm state. The signal attenuator causes the at least one output to slowly oscillate between the first state and the second state when the unattenuated AC output of the amplifier-phase shift circuit is greater than the predetermined level for switching the phase lock circuit to the second state but less than a second predetermined level. The modulating frequency in this embodiment is an audio frequency, and the alarm circuit includes an audible alarm device drivable by the modulating frequency oscillator. The modulating frequency drives the audible alarm device when the output of the phase lock circuit is in the second state and does not drive the audible alarm device when the output of the phase lock circuit is in the first state. The use of the signal attenuator causes the alarm to slowly oscillate between on and off for weak signals, but allows the alarm to come on full strength for strong signals.

A radiation detector according to the present invention is especially well suited for being a radar detector because of its low cost and high reliability. As a radar detector, one embodiment would include a dipole antenna located in the corner reflector, an X-band dipole for 10.525 GHz and a K-band dipole for 24.150 GHz.

These and other objects, advantages and features of this invention will be apparent from the following description taken with reference to the accompanying drawings, wherein is shown the preferred embodiments of the invention.

DETAILED DESCRIPTION

1. Prior Art

Figure 1:
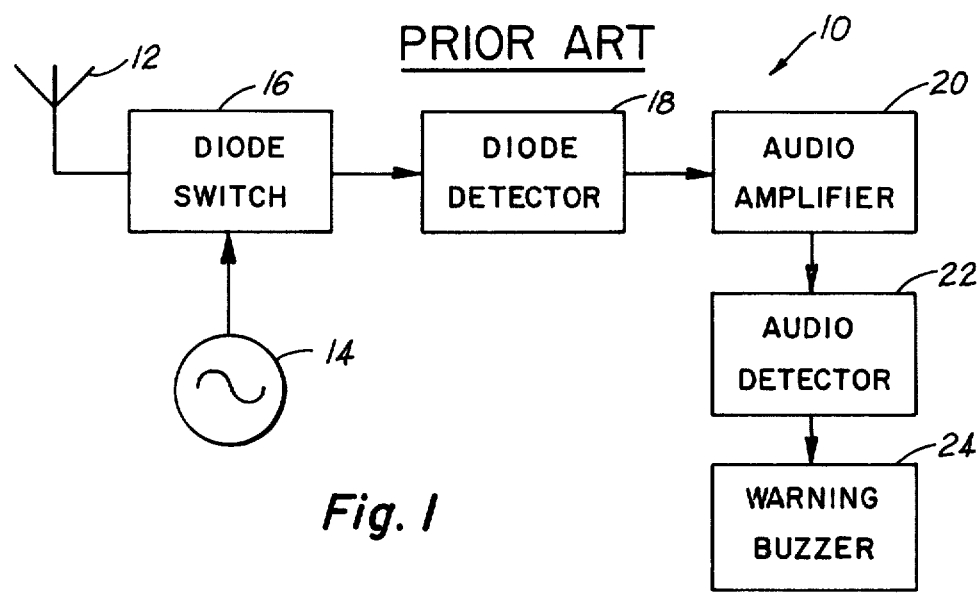
FIG. 1 is a block diagram of a typical prior art radar detector.

Referring now to the drawings, a typical prior art radar detector is referred to generally by reference numeral 10. Radar detector 10 includes an antenna 12 for receiving radar signals and an audio oscillator 14 for generating an audio signal for modulating the radar signal received by antenna 12. Prior art radar detector 10 further includes a diode switch 16 which acts as the radar frequency modulator, and a diode detector 18 for detecting the presence of the modulated radar frequency signal. The output of diode detector 18 is an audio signal whenever a radar signal is received by antenna 12. Prior art radar detector 10 further includes an audio amplifier 20 for amplifying the audio output of diode detector 18, and an audio detector 22 to detect the presence of the amplified audio output of audio amplifier 20. Finally, prior art radar detector 10 also includes an alarm circuit such as warning buzzer 24 to generate an alarm in response to audio detector 22 detecting the presence of an audio signal. Detectors such as prior art radar detector 10 had to include two separate detector circuits, one for detecting the presence of the radiation signal and the other to detect the presence of the modulating signal.

2. Present Invention

Figure 2:
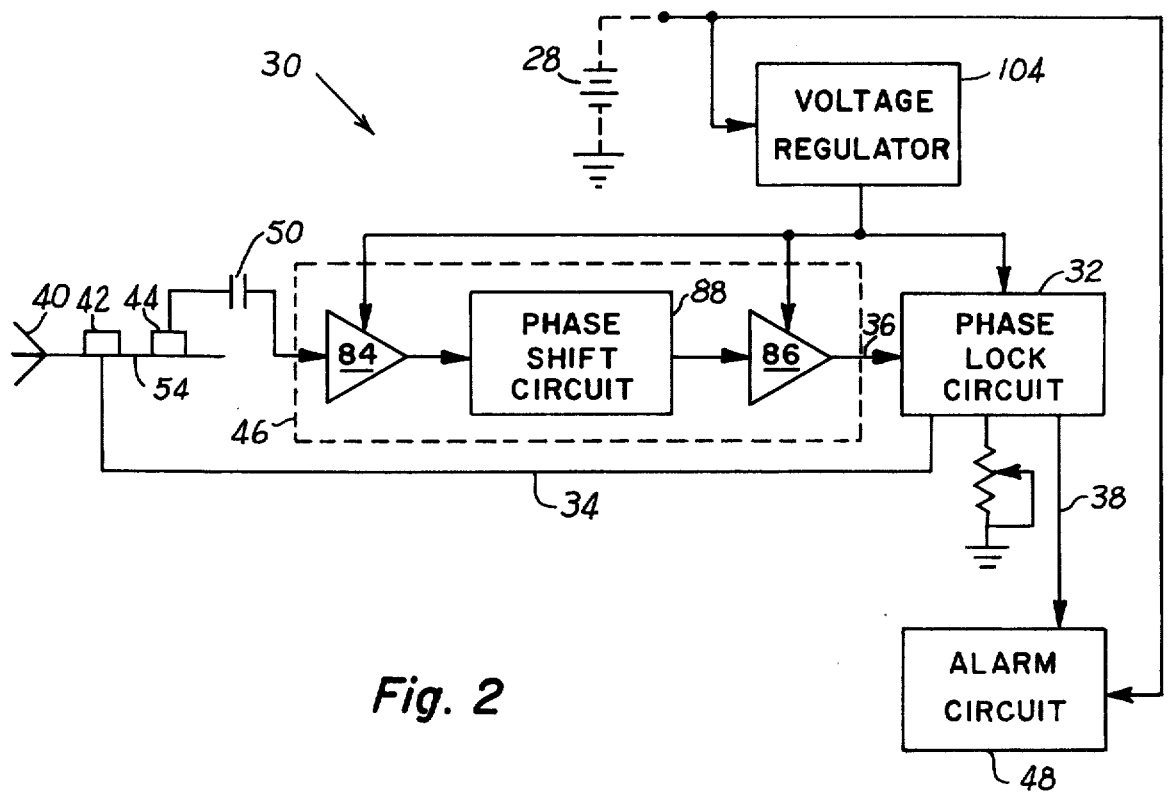
FIG. 2 is a block diagram of a radiation detector in accordance with the present invention.
Figure 3:
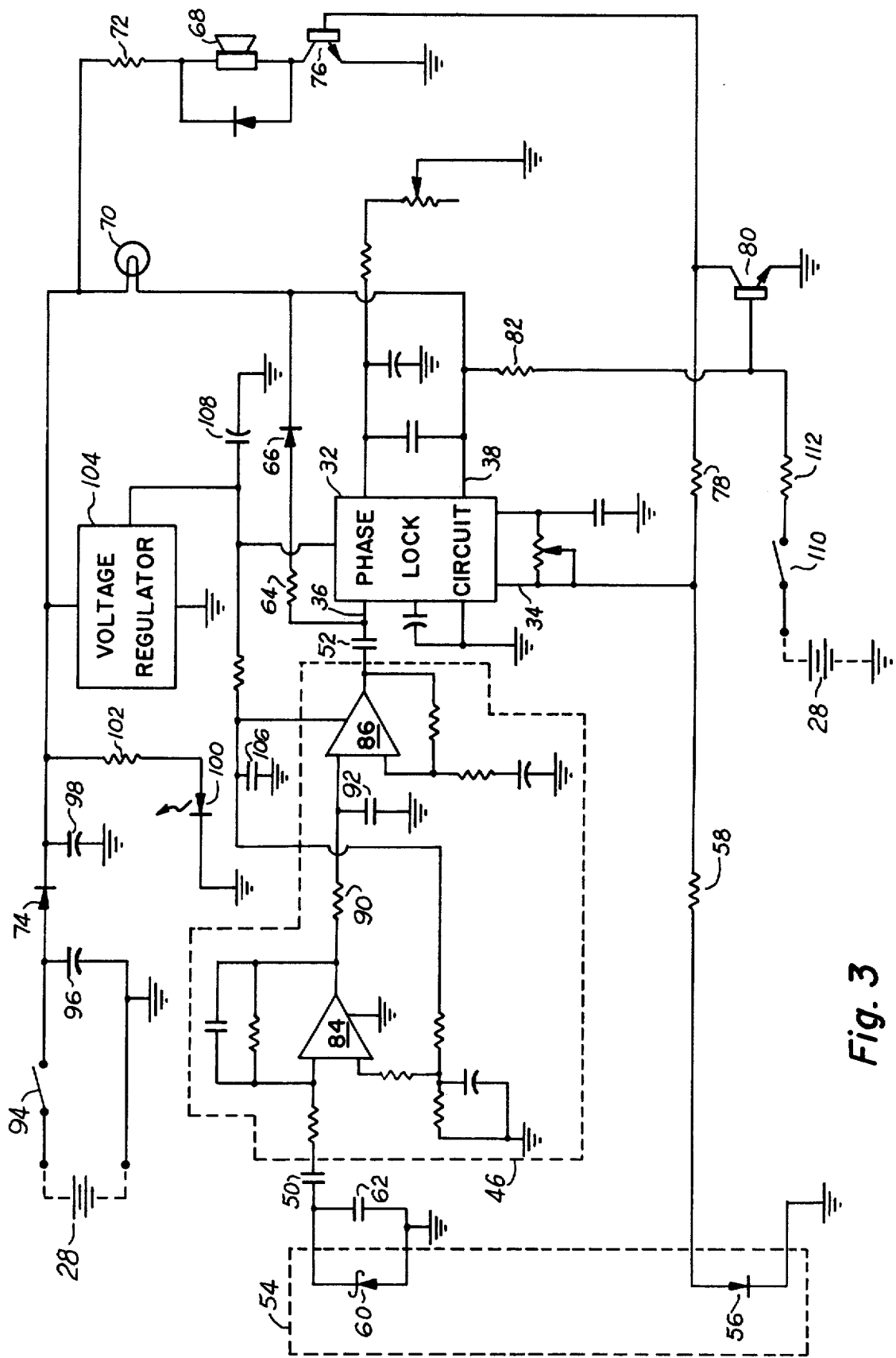
FIG. 3 is a schematic representation of the radiation detector of FIG. 2.

Referring now to FIGS. 2 and 3, a radiation detector according to the present invention is referred to generally by reference numeral 30 and is powered by a power supply 28. Radiation detector 30 comprises a phase lock circuit 32 including a modulating frequency oscillator with modulating frequency oscillator output 34, at least one input 36, and at least one output 38 drivable by a signal of substantially the modulating frequency shifted in phase by a predetermined amount applied to at least one input 36. Suitable phase lock circuits including modulating frequency oscillators are commercially available in integrated circuit form. Radiation detector 30 further comprises a radiation frequency antenna 40 for receiving radiation, a radiation frequency modulator 42 for modulating the radiation received from antenna 40 with the modulating frequency received from the modulating frequency oscillator by output 34, an envelope detector 44 for detecting the modulated radiation envelope, an amplifier-phase shift circuit 46 coupled to the AC output of envelope detector 44 for amplifying and shifting the phase of the AC output of envelope detector 44 to the predetermined amount, and an alarm circuit 48 for generating an alarm responsive to phase lock circuit 32. At least one input 36 of phase lock circuit 32 is responsive to the output of amplifier phase shift circuit 46, and an alarm is generated when a signal is present at the output of amplifier-phase shift circuit 46 so that an alarm is generated when a radiation frequency signal is received by radiation frequency antenna 40. One means for coupling amplifier-phase shift circuit 46 to the AC output of envelope detector 44 is by a capacitor 50 connected between amplifier-phase shift circuit and the output of the envelope detector. In a radiation detector 30 adapted to be a radar detector, antenna 40 would include an antenna suitable for X-band, 10.525 GHz and for K-band, 24.150 GHz.

Input 36 of phase lock circuit 32 is coupled to the AC output of amplifier-phase shift circuit 46 by means of a capacitor 52. Phase lock circuit 32, in one embodiment, comprises an integrated circuit phase lock circuit such as is commercially available. Such commercially available phase lock circuits normally include a switch at the output which is responsive to the input. In this case, phase lock circuit 32 comprises a switch with a first state responsive to the AC output of amplifier phase shift circuit 46 being less than a predetermined level and a second state responsive to the AC output of the amplifier phase shift circuit being greater than the predetermined level, the at least one output of the phase lock circuit comprising the output of the switch. Alarm circuit 48 generates an alarm responsive to at least one output 38 of phase lock circuit 32 being in the second state whereby alarm circuit 48 is responsive to phase lock circuit 32.

Radiation detector 30 further includes a strip-type transmission line 54 such as microstrip transmission line connecting radiation frequency antenna 40, radiation frequency modulator 42 and envelope detector 44. Radiation frequency modulator 42 comprises a device driven by a modulating frequency oscillator output 34. The device comprises a substantially short circuit between the conductors of strip type transmission line 54 during an approximately one-half of the modulating frequency cycle and a substantially open circuit between the conductors of the strip-type transmission line during the other approximately one-half of the modulating frequency cycle so that strip-type transmission line 54 is short circuited during approximately one-half of the modulating frequency cycle, whereby the radiation frequency is modulated. One such suitable device for radiaton frequency modulator 42 is a p-i-n diode 56 connecting the conductors of strip-type transmission line 54 in series with a resistor 58 wherein the series combination resistor 58 and p-i-n diode 56 is connected between modulating frequency oscillator output 34 and ground. A preferred embodiment of phase lock circuit 32 for such a case would include a modulating frequency oscillator that generates a substantially square wave although other waveforms can also be used.

A preferred embodiment of envelope detector 44 comprises a Schottky diode 60 connected between the conductors of strip-type transmission line 54 for half-wave rectifing the modulated radiation, and a capacitor 62 connected in parallel to Schottky diode 60. The AC output of envelope detector 44 is the AC voltage across capacitor 62.

Radiation detector 30 further comprises a signal attenuator including a resistor 64 and a diode 66 for attenuating the AC output of amplifier-phase shift circuit 46 when at least one output 38 of phase lock circuit 32 is in the second state, causing the at least one output to slowly oscillate between the first state and the second state when the unattenuated AC output of amplifier-phase shift circuit 46 is greater than the predetermined level but less than a second predetermined level. In a preferred arrangement, the modulating frequency is an audio frequency and alarm circuit 48 includes an audible alarm device 68 drivable by the modulating frequency oscillator through output 34. The modulating frequency drives the audible alarm device when at least one output 38 of phase lock circuit 32 is in the second state and does not drive the audible alarm device when at least one output 38 of phase lock circuit 32 is in the first state.

Audible alarm device 60 is connected to power supply 28 through a resistor 72 and diode 74 and to ground through a transistor 76. Transistor 76 is driven by the audio oscillator through output 34 and a resistor 78. Alarm circuit 48 further includes a transistor 80 and a resistor 82 connecting the base of transistor 80 to at least one output 38 of phase lock circuit 32 whereby transistor 80 is driven by at least one output 38. The emitter of transistor 80 is connected to ground and the collector is connected to the base of transistor 76 whereby transistor 80 can pull the base of transistor 76 low, opening the collector to emitter of transistor 76 and turning audible alarm device 68 off when at least one output 38 of phase lock circuit 32 is in the first state. Likewise, when at least one output 38 is in the second state allowing the collector of transistor 80 to go high, transistor 76 is driven by audio oscillator output 34 causing an audible signal to emit from audible alarm device 68.

Alarm circuit 48 further includes a visible alarm device 70 connected between power supply 28 through a diode 74 and at least one output 38, drivable by at least one output 38, at least one output 38 driving the visible alarm device when in the second state and not driving the visible alarm device when in the first state.

Amplifier-phase shift circuit 46 includes a two stage amplifier made up of amplifier stages 84 and 86 and a phase shift circuit 88. Phase shift circuit 88 includes a resistor 90 connected between the output of amplifier stage 84 and the input to amplifier stage 86, and a capacitor 92 connected between the input to amplifier stage 86 and ground.

Radiation detector 30 further includes an on/off switch 94, power supply filter capacitors 96 and 98, a power on indicator including light emitting diode 100 in series with resistor 102 connected between power supply 28 and ground and a voltage regulator 104 along with its filtering capacitors 106 and 108 for providing regulated voltage to amplifier stages 84 and 86. Radiation detector 30 further includes an audible alarm disable switch 110 in series with a resistor 112 between power supply 28 and the base of transistor 80 for disabling audible alarm device 68 for operating with visible alarm device 70 only.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in any limiting sense.

The invention having been described, what is claimed is:

1. A radiation detector comprising in combination:
   a phase lock circuit including a modulating frequency oscillator, at least one input, and at least one output drivable by a signal of substantially the modulating frequency shifted in phase by a predetermined amount applied to the at least one input;
   a radiation frequency antenna for receiving radiation;
   a radiation frequency modulator for modulating the radiation received from the antenna with the modulating frequency received from the modulating frequency oscillator;
   an envelope detector for detecting the modulated radiation envelope;
   an amplifier-phase shift circuit coupled to the AC output of the envelope detector for amplifying and shifting the phase of the AC output of the envelope detector to the predetermined amount, wherein the at least one input of the phase lock circuit is responsive to the output of the amplifier-phase shift circuit; and
   an alarm circuit for generating an alarm responsive to the phase lock circuit wherein an alarm is generated when a signal is present at the output of the amplifier-phase shift circuit whereby an alarm is generated when a radiation frequency signal is received by the radiation frequency antenna.

2. A radiation detector according to claim 1 wherein the input of the phase lock circuit is coupled to the AC output of the amplifier-phase shift circuit, and the phase lock circuit comprises a switch with a first state responsive to the AC output of the amplifier-phase shift circuit being less than a predetermined level and a second state responsive to the AC output of the amplifier-phase shift circuit being greater than the predetermined level, the at least one output of the phase lock circuit comprising the output of the switch, and wherein the alarm circuit generates an alarm responsive to the at least one output of the phase lock circuit being in the second state whereby the alarm circuit is responsive to the phase lock circuit.

3. A radiation detector according to claim 2 further comprising a strip-type transmission line connecting the radiation frequency antenna, the radiation frequency modulator and the envelope detector, wherein the radiation frequency modulator comprises a device driven by the modulating frequency oscillator, the device comprising a substantially short circuit between the conductors of the strip-type transmission line during an approximately one-half of the modulating frequency cycle and a substantially open circuit between the conductors of the strip-type transmission line during the other approximately one-half of the modulating frequency cycle whereby the strip type transmission line is short circuited during approximately one-half of the modulating frequency cycle, whereby the radiation frequency is modulated.

4. A radiation detector according to claim 3 wherein the envelope detector comprises a Schottky diode connected between the conductors of the strip type transmission line for half wave rectifying the modulated radiation, and a capacitor connected in parallel to the Schottky diode wherein the AC output of the envelope detector is the AC voltage across the capacitor.

5. A radiation detector according to claim 4 further comprising a signal attenuator for attenuating the AC output of the amplifier-phase shift circuit when the at least one output of the phase lock circuit is in the second state, causing the at least one output to slowly oscillate between the first state and the second state when the unattenuated AC output of the amplifier-phase shift circuit is greater than the predetermined level but less than a second predetermined level, wherein the modulating frequency is an audio frequency, and the alarm circuit comprises an audible alarm device drivable by the modulating frequency oscillator, the modulating frequency driving the audible alarm device when the at least one output of the phase lock circuit is in the second state and not driving the audible alarm device when the at least one output of the phase lock circuit is in the first state.

6. A radiation detector according to claim 2 further comprising a signal attenuator for attenuating the AC output of the amplifier-phase shift circuit when the at least one output of the phase lock circuit is in the second state, causing the at least one output to slowly oscillate between the first state and the second state when the unattenuated AC output of the amplifier-phase shift circuit is greater than the predetermined level but less than a second predetermined level, wherein the modulating frequency is an audio frequency, and the alarm circuit comprises an audible alarm device drivable by the modulating frequency oscillator, the modulating frequency driving the audible alarm device when the at least one output of the phase lock circuit is in the second state and not driving the audible alarm device when the at least one output of the phase lock circuit is in the first state.

7. A radiation detector according to claim 1 further comprising a strip-type transmission line connecting the radiation frequency antenna, the radiation frequency modulator and the envelope detector, wherein the radiation frequency modulator comprises a device driven by the modulating frequency oscillator, the device comprising a substantially short circuit between the conductors of the strip-type transmission line during an approximately one-half of the modulating frequency cycle and a substantially open circuit between the conductors of the strip-type transmission line during the other approximately one-half of the modulating frequency cycle whereby the strip-type transmission line is short circuited during approximately one-half of the modulating frequency cycle, whereby the radiation frequency is modulated.

8. A radiation detector according to claim 7 wherein the envelope detector comprises a Schottky diode connected between the conductors of the strip-type transmission line for half wave rectifying the modulated radiation, and a capacitor connected in parallel to the Schottky diode wherein the AC output of the envelope detector is the AC voltage across the capacitor.

9. A radiation detector according to claim 1 wherein the radiation detector is a radar detector.

10. A radiation detector according to claim 9 wherein the input of the phase lock circuit is coupled to the AC output of the amplifier-phase shift circuit, and the phase lock circuit comprises a switch with a first state responsive to the AC output of the amplifier-phase shift circuit being less than a predetermined level and a second state responsive to the AC output of the amplifier-phase shift circuit being greater than the predetermined level, the at least one output of the phase lock circuit comprising the output of the switch, and wherein the alarm circuit generates an alarm responsive to the at least one output of the phase lock circuit being in the second state whereby the alarm circuit is responsive to the phase lock circuit.

11. A radiation detector according to claim 10 further comprising a strip-type transmission line connecting the radiation frequency antenna, the radiation frequency modulator and the envelope detector, wherein the radiation frequency modulator comprises a device driven by the modulating frequency oscillator, the device comprising a substantially short circuit between the conductors of the strip-type transmission line during an approximately one-half of the modulating frequency cycle and a substantially open circuit between the conductors of the strip-type transmission line during the other approximately one-half of the modulating frequency cycle whereby the strip-type transmission line is short circuited during approximately one-half of the modulating frequency cycle, whereby the radiation frequency is modulated.

12. A radiation detector according to claim 11 wherein the envelope detector comprises a Schottky diode connected between the conductors of the strip-type transmission line for half wave rectifying the modulated radiation, and a capacitor connected in parallel to the Schottky diode wherein the AC output of the envelope detector is the AC voltage across the capacitor.

13. A radiation detector according to claim 12 further comprising a signal attenuator for attenuating the AC output of the amplifier-phase shift circuit when the at least one output of the phase lock circuit is in the second state, causing the at least one output to slowly oscillate between the first state and the second state when the unattenuated AC output of the amplifier-phase shift circuit is greater than the predetermined level but less than a second predetermined level, wherein the modulating frequency is an audio frequency, and the alarm circuit comprises an audible alarm device drivable by the modulating frequency oscillator, the modulating frequency driving the audible alarm device when the at least one output of the phase lock circuit is in the second state and not driving the audible alarm device when the at least one output of the phase lock circuit is in the first state.

14. A radiaton detector according to claim 10 further comprising a signal attenuator for attenuating the AC output of the amplifier-phase shift circuit when the at least one output of the phase lock circuit is in the second state, causing the at least one output to slowly oscillate between the first state and the second state when the unattenuated AC output of the amplifier-phase shift circuit is greater than the predetermined level but less than a second predetermined level, wherein the modulating frequency is an audio frequency, and the alarm circuit comprises an audible alarm device drivable by the modulating frequency oscillator, the modulating frequency driving the audible alarm device when the at least one output of the phase lock circuit is in the second state and not driving the audible alarm device when the at least one output of the phase lock circuit is in the first state.

15. A radiation detector according to claim 9 further comprising a strip-type transmission line connecting the radiation frequency antenna, the radiation frequency modulator and the envelope detector, wherein the radiation frequency modulator comprises a device driven by the modulating frequency oscillator, the device comprising a substantially short circuit between the conductors of the strip-type transmission line during an approximately one-half of the modulating frequency cycle and a substantially open circuit between the conductors of the strip-type transmission line during the other approximately one-half of the modulating frequency cycle whereby the strip-type transmission line is short circuited during approximately one-half of the modulating frequency cycle, whereby the radiation frequency is modulated.

16. A radiation detector according to claim 15 wherein the envelope detector comprises a Schottky diode connected between the conductors of the strip-type transmission line for half wave rectifying the modulated radiation, and a capacitor connected in parallel to the Schottky diode wherein the AC output of the envelope detector is the AC voltage across the capacitor.

* * * * *